United States Patent [19]

Wursch et al.

[11] Patent Number: 6,013,301
[45] Date of Patent: Jan. 11, 2000

[54] LOW FAT SPREADABLE FOOD PRODUCT

[75] Inventors: Pierre Wursch, La Tour-De-Peilz; Vladimir Borisovich Tolstoguzov, Pully, both of Switzerland

[73] Assignee: Nestec SA, Vevey, Switzerland

[21] Appl. No.: 09/101,818

[22] PCT Filed: Jan. 13, 1997

[86] PCT No.: PCT/IB97/00013

§ 371 Date: Jul. 17, 1998

§ 102(e) Date: Jul. 17, 1998

[87] PCT Pub. No.: WO97/25875

PCT Pub. Date: Jul. 24, 1997

[30] Foreign Application Priority Data

Jan. 19, 1996 [EP] European Pat. Off. .............. 96100796

[51] Int. Cl.⁷ ..................................................... A23D 7/00
[52] U.S. Cl. ........................................... 426/578; 426/603
[58] Field of Search ..................................... 426/578, 603

[56] References Cited

U.S. PATENT DOCUMENTS

| | | | |
|---|---|---|---|
| 5,338,562 | 8/1994 | Humphreys | 426/603 |
| 5,378,491 | 1/1995 | Stanley | 426/661 |
| 5,387,426 | 2/1995 | Harris | 426/578 |
| 5,395,640 | 3/1995 | Harris | 426/578 |
| 5,431,951 | 7/1995 | Bamford | 426/658 |
| 5,436,019 | 7/1995 | Harris | 426/578 |
| 5,470,391 | 11/1995 | Mallee | 127/38 |
| 5,547,513 | 8/1996 | Mallee | 426/578 |
| 5,656,323 | 8/1997 | Underdown | 426/603 |
| 5,679,395 | 10/1997 | Finocchiaro | 426/603 |
| 5,759,581 | 6/1998 | Baensch | 424/489 |

FOREIGN PATENT DOCUMENTS

| | | |
|---|---|---|
| 0 237 120 | 5/1989 | European Pat. Off. . |
| 0 380 170 | 8/1990 | European Pat. Off. . |
| 0 588 556 | 3/1994 | European Pat. Off. . |
| WO97/25875 | 7/1997 | Switzerland . |
| 2 150 586 | 7/1985 | United Kingdom . |
| WO 89/12403 | 12/1989 | WIPO . |
| WO 93/17565 | 9/1993 | WIPO . |
| WO 93/24016 | 12/1993 | WIPO . |
| WO 93/25084 | 12/1993 | WIPO . |
| WO 95/10196 | 4/1995 | WIPO . |
| WO 96/03057 | 2/1996 | WIPO . |

*Primary Examiner*—Carolyn Paden
*Attorney, Agent, or Firm*—Young & Thompson

[57] ABSTRACT

A low fat spreadable food product is disclosed which is usable as a butter replacer and has from 0 to about 30 wt. % fat. The product contains from 4 to 30 wt. % of thermally stabilized non crystalline particles of high amylose starch having a diameter in the range of 5 to 30 microns.

11 Claims, No Drawings

LOW FAT SPREADABLE FOOD PRODUCT

FIELD OF THE INVENTION

The present invention relates to a spreadable food product with a low fat content or which is free from added fat.

BACKGROUND OF THE INVENTION

There is still presently a strong wish to have available on the market spreadable food products to be used as substitutes for butter, margarine or other similar fat spreads, and having a low level of fat so as to reduce the caloric content thereof, or for other dietetic considerations.

Spreads are already known in which the fat has been partially replaced by other products such as proteins, gelatin, hydrolysed or modified starches and/or maltodextrin, etc, as disclosed for example in EP-A-237120 and WO 93/17565.

However, none of these known available low fat spreads is really satisfying for the consumer, since they may have unusual flavour, taste, texture, consistency, appearance or mouthfeel (as being for example somewhat grainy), and are not sufficiently heat resistant. Furthermore, some of these known spreads involve a manufacturing method which is relatively complex or too expensive to carry out.

On the other hand, a new fat replacer, food grade texture agent, has been developed by the same applicant, which is described in the International application WO 96/03057, and which is consisting in microparticulate high amylose starch, and more particularly in thermally stabilized swelling resistant and non crystalline particles of high amylose starch, in which the amylose content of the starch is of 40 to 70%, and in which 90% of the particles have a diameter in the range of 5 to 30 microns.

SUMMARY OF THE INVENTION

The present inventors have now unexpectedly found that said microparticulate high amylose starch can advantageously be used also for preparing a high quality spreadable product of low fat level and even a fat free product, which includes all the required features defined above and which are not presented by the prior known low fat spreads referred above, especially as being pasteurizable or heat resistant (to temperatures higher than about 65° C.).

Accordingly, the object of the present invention is consisting in a water-continuous low fat spreadable food product having from 0 to 30 wt % fat and which comprises from 4 to 30 wt % of thermally stabilized non crystalline particles of high amylose starch having a diameter in the range of 5 to 30 microns.

Preferably, the spread according to the invention contains from 0 to 10% of fat, and the average diameter of the starch particles is of 10 to 20 microns.

Furthermore, the product according to the invention may contain a water-soluble gel-forming polysaccharide, for example from 5 to 20 wt % of low DE gelling hydrolysed starch, such as maltodextrin.

According to a further embodiment, the spread according to the invention may further contain other gelling and/or thickening agents, and optionally food colours, edible surfactants, lipids, flavouring and/or preservative agents, etc, the rest being essentially water.

Regarding to the particulate high amylose starch, whose amylose content is higher than about 40%, it can preferably be obtained as described in the above-mentioned International application WO 96/03057. Such preparation process comprises the steps of suspending the high amylose starch in water (approximatively 4 volumes of water), heating and mixing the slurry (starch suspension) first at about 90 to 100° C., preferably 95–100° C., under continuous controlled stirring to avoid particle aggregation and so as to form the aimed particle gel product, and then cooling said product. The stirring must effectively be such that a too high shearing which could destroy the particles is avoided, but its efficiency has to be sufficient to avoid particles aggregation during the heat treatment so as to reach the stabilization of the particle structure. Preferably, the process includes a second heating step up to 40 to 80° C., and it can be advantageously carried out under a pressure of about 0.3 bar. Each step of this process can be of at least 10 min; as an example, it can have the steps of first heating upto 95–100° for about 30 min, maintaining said temperature during about 30 min, cooling slowly the product obtained up to room temperature (20–30° C.) within about 25 min, further heating said product up to 40–80° C. (about 60° C.) within about 15 min, and cooling it again within about 5 min to room temperature.

The particulate product thus obtained is in the form of grains having a gelled soft structure, which retained in fact the non crystalline structure of the starting starch used. The particles have not been chemically modified nor altered by the controlled thermal and mechanical treatment, and have proven to be resistant to shearing, heating (up to 125° C.) and acid, as well as swelling resistant, for example in aqueous medium up to 120° C. The average diameter of the particle is of about 15–17$\mu$, whereas the particles size distribution is such that about 90% of the particles have a diameter in the range of about 5 to 30$\mu$.

The thick slurry obtained (tridimensional particles gel network in water) can be directly used as such, or preferably after spray-drying in a mixture with 0.5 to 1.0 wt equivalent of (malto)dextrin (DE 6–12).

As starting product for the preparation of the aimed particular starch, different kinds of native high amylose starch can be used, for example "Eurylon VII" (from Roquette, Lestrem, France) containing 70% amylose and "Amaizo 2568F" (American Maize Product CO., Hammond, Ind., USA) containing 45–50% of amylose.

The maltodextrin which is usable in the product according to the invention as gelling hydrolysed starch will have a low DE value, for example less than 12, and preferably from 1 to 6.

As already mentioned, the low fat spread according to the invention may further contain other thickening or gelling agents in order to adjust the viscosity of the product, such as waxy maize starch, pectin, carrogeenan, xanthan, alginate, etc.

Although not being particularly preferred, the spread may also contain other ingredients, such as flavouring agents (for example butter flavour), preservatives (for example potassium sorbate), salt (e.g. sodium chloride), acidifiers (e.g. lactic acid), vitamins, food colouring products, edible surfactants, lipids, etc. It is to be however pointed out that caution should be taken to avoid ingredients which may alter the taste or flavour of the final low fat spread for the consumer.

As fat which can be used in the present invention, any kind of conventional edible fat, such as cream, any emulsified vegetable fat (soya, canolla, peanut, etc).

DETAILED DESCRIPTION OF THE INVENTION

The invention will now be illustrated by the following Examples.

EXAMPLE 1 Free Fat Spread

| | Composition (wt %) | |
|---|---|---|
| A. | Maltodextrin ("Snowflake 1906") | 15 |
| | Waxy maize starch ("WDC 1001") | 1.5 |
| | Salt | 0.05 |
| | Sodium benzoate | 0.05 |
| | Potassium sorbate | 0.05 |
| | Lactic acid | 0.25 |
| | Water | 75 |
| B*. | Particulate high amylose starch | 4 |
| | Dextrin (DE 10) | 4 |

(*= mixture 1:1 of spray-dried high amylose starch particles and dextrin).

A "margarine-type" product was first prepared by mixing all the ingredients A in water at 50° C.; the mixture was heated to about 100° C. and mixed with a "Polytron" homogenizer. Then product B was added and gently mixed to homogeneity. The mix was cooled down to about 6° C. and kept overnight to obtain the desired texture.

Peak force (=resistance to penetration of a flat probe) was measured using a "TA-XT2" Texture Analyser (of Texture Technologies Co) equipped with a 2.5 cm diameter flat metal probe. The peak force was measured (at 6 and 20° C.) by inserting the probe to constant depth (2 mm) at a constant speed (1 mm/sec) on spread samples after storage at 6° C. for 1 day. The results obtained by measurements made half a day later were the following:

peak force: 2.7 N (6° C.) and 2.5 N (20° C.)

EXAMPLE 2 Reduced Fat Spreads (20%)

| | Compositions (wt %) | I | II |
|---|---|---|---|
| | Fresh cream (35% fat) | 57.0 | 57.0 |
| * { | Particulate high amylose starch | 18.3 | 8.3 |
| | Dextrin (DE10) | 9.2 | 4.2 |
| | Maltodextrin ("Snowflakes 1906) | 5.0 | 15.0 |
| | Water | 15.5 | 15.5 |

(*= mixture ca. 1:0.5 of spray-dried high amylose starch particles and dextrin)

Water was first added to cream and heated about 60° C.; the other components were then slowly added under mixing, and the respective mixtures cooled down at refrigeration temperature.

Peak force measurements carried out as in Example 1 gave the following results:

peak force:
I 3.4 N (6° C.) and 1.8 N (20° C.)
II 2.6 N (6° C.) and 1.6 N (20° C.)

As a comparison, the peak force of 40% margarine is of 1.6 N at 20° C. and of about 10 N at 6° C. This means that at low temperatures the spreads according to the present invention can be more easily applied for example on bread. Furthermore, the above results of the peak force measurements indicate that the influence of the temperature on the spreadability of the food products according to this invention is much less than in the case of margarine type products.

EXAMPLE 3
Low Fat Spread Cream

A low fat spread cream and a usual spread cream (as reference) have been prepared with the following respective compositions:

| | | Low fat (wt %) | Reference (wt %) |
|---|---|---|---|
| A. | Gelatin | 1.6 | 1.6 |
| | Maltodextrin (DE 12) | 8 | 12 |
| | Particulate high amylose starch | 16 | — |
| | Sodium sorbate | 0.08 | 0.08 |
| | Sodium chloride | 1.4 | 1.4 |
| | Water | 67.2 | 44.8 |
| B. | Soya oil | 4 | 32 |
| | Soya fat | 1 | 8 |
| | Emulsifier | 0.5 | 0.5 |

(Dimodan P ® from Danisco)

Mixtures A and B have been heated separately to about 85° C. for 5 min. and cooled down to about 60° C. Solution A has been then added slowly to solution B in a waring blender, and the emulsion thus obtained cooled down and stored 5 days at about 4° C.

The two creams obtained as described above are similarly onctuous, shiny and with good spreadability, but the respective energy contents thereof are very different, since it is of 419 kcal for the reference cream and only of 147 kcal for the cream according to the invention.

As a separate experiment, a spray-dried high amylose starch, of the type used in the present invention, was suspended in water and heated at about 85° C. for 10 min. A subsequent microscopic examination of the suspension revealed that starch granules are loosely associated together, and no significant increase in aggregation was noticeable after the heating. Also, the average particle size of the suspended high amylose starch measured by laser light scattering did not indicate a volume increase of the granules after said heating.

It has further been stated that the fat free, respectively low fat, spreads described above present sensorial and textural properties (mouthfeel consistency) which can be quite comparable to those of standard butter.

Finally and thanks to the solid state of the small gel granules of high amylose starch used in the present invention, the rheological properties of the free fat or low fat spread according to this invention can be more easily and precisely controlled than according to the known methods. The thermal stability of the microparticulate high amylose starch used further makes the system sterilization easier, as well as the preparation process of the spread as a whole, and increases the structural stability of the spreadable product.

We claim:

1. Low fat spreadable food product having from 0 to about 30 wt % fat and which comprises from 4 to 30 wt % of thermally stabilized non crystalline particles of high amylose starch having a diameter in the range of 5 to 30 microns, in which said particles are obtained by a method comprising the steps of suspending the starch with a high amylose content of 40 to 70% in water, heating the slurry to about 90–100° C. under continuous controlled stirring to avoid particle aggregation and so as to form a particulated gel product and cooling said product.

2. Spreadable food product according to claim 1, in which the fat content is of 0 to 10 wt % and the average diameter of the starch particles is of 10 to 20 microns.

3. Spreadable food product according to claim 1, in which the particulated gel product obtained is further reheated to 40–80° C. and cooled again.

4. Spreadable food product according to claim 1, in which the particles of high amylose starch are spray-dried with 0,5 to 1.0 wt equivalent of (malto)dextrin.

5. Spreadable food product according to claim 1, which further contains a water-soluble gel-forming polysaccharide.

6. Spreadable food product according to claim 5, which contains from 5 to 20 wt % of a low DE gelling hydrolysed starch.

7. Spreadable food product according to claim 6, in which the gelling starch is maltodextrin with a DE less than about 12.

8. Spreadable food product according to claim 1, in which the fat is cream or an emulsified vegetable fat.

9. Spreadable food product according to claim 1, which further contains a thickening agent, which can be selected from the group consisting of starch, pectin, carrageenan, xanthan and alginate.

10. Spreadable food product according to claim 9, which further contains at least one of a flavouring agent, a salt, a preservative, an acidifier, an edible surfactant, vitamins, lipids and a colouring agent.

11. Spreadable food product according to claim 1, which is heat treatable in the temperature range of pasteurization.

* * * * *